United States Patent
Cho et al.

(10) Patent No.: US 8,931,944 B2
(45) Date of Patent: Jan. 13, 2015

(54) DISPLAY APPARATUS AND LIGHT SOURCE PACKAGES EMPLOYED THEREIN

(75) Inventors: Joo Woan Cho, Asan-si (KR); Hyun-Hwa Song, Asan-si (KR); Eui Jeong Kang, Asan-si (KR); Seongsik Choi, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 60 days.

(21) Appl. No.: 13/423,937

(22) Filed: Mar. 19, 2012

(65) Prior Publication Data

US 2013/0039092 A1 Feb. 14, 2013

(30) Foreign Application Priority Data

Aug. 9, 2011 (KR) .................. 10-2011-0079179

(51) Int. Cl.
*H01L 33/00* (2010.01)
*F21V 29/00* (2006.01)
*F21V 8/00* (2006.01)

(52) U.S. Cl.
CPC .............. *G02B 6/009* (2013.01); *G02B 6/0091* (2013.01); *G02B 6/0073* (2013.01); *G02B 6/0083* (2013.01)
USPC ....... 362/612; 362/249.02; 362/294; 362/373

(58) Field of Classification Search
USPC ........ 349/63, 65; 362/97.3, 249.02, 294, 373, 362/613
See application file for complete search history.

(56) References Cited

U.S. PATENT DOCUMENTS

| 7,175,329 | B1* | 2/2007 | Chou | 362/612 |
| 7,339,201 | B2* | 3/2008 | Yamazaki | 257/99 |
| 7,427,145 | B2* | 9/2008 | Jang et al. | 362/236 |
| 7,436,000 | B2 | 10/2008 | Kim et al. | |
| 7,497,609 | B2* | 3/2009 | Maeda et al. | 362/616 |
| 8,083,372 | B2* | 12/2011 | Mita et al. | 362/249.01 |
| 8,240,882 | B2* | 8/2012 | Liao et al. | 362/249.02 |
| 8,317,387 | B2* | 11/2012 | Seo | 362/612 |
| 8,430,524 | B2* | 4/2013 | Chen et al. | 362/240 |
| 8,485,711 | B2* | 7/2013 | Wang et al. | 362/615 |
| 8,506,151 | B2* | 8/2013 | Park | 362/613 |

(Continued)

FOREIGN PATENT DOCUMENTS

| JP | 04-127220 | 4/1992 |
| JP | 2002-043632 | 2/2002 |

(Continued)

*Primary Examiner* — Peggy Neils
(74) *Attorney, Agent, or Firm* — F. Chau & Associates, LLC

(57) ABSTRACT

Display apparatuses are provided. The display apparatus includes a light source package generating light, a circuit board including a recessed region in which the light source package is disposed, a display panel displaying images, and a light guide plate directing the light generated from the light source package onto the display panel. The light guide plate includes a top surface, a bottom surface, and a plurality of sidewall surfaces. One of the sidewall surfaces of the light guide plate is a light incident surface on which the light from the light source package is irradiated. A distance between the light source package and the light incident surface is less than a width of the circuit board.

22 Claims, 9 Drawing Sheets

(56) References Cited

U.S. PATENT DOCUMENTS

| | | |
|---|---|---|
| 2004/0151006 A1 | 8/2004 | Yang |
| 2008/0149373 A1 | 6/2008 | Kim et al. |
| 2011/0007521 A1* | 1/2011 | Wu et al. ............. 362/612 |
| 2011/0149602 A1* | 6/2011 | Lee et al. ............. 362/612 |
| 2011/0182085 A1* | 7/2011 | Ko et al. ............. 362/612 |
| 2012/0002427 A1* | 1/2012 | Moon et al. ............. 362/382 |
| 2012/0075886 A1* | 3/2012 | Park et al. ............. 362/611 |

FOREIGN PATENT DOCUMENTS

| | | |
|---|---|---|
| KR | 10-0791736 | 6/2007 |
| KR | 10-2008-0071735 | 8/2008 |
| KR | 100869530 | 11/2008 |
| KR | 10-2008-0105273 | 12/2008 |
| KR | 10-2009-0113535 | 11/2009 |
| KR | 102010002453 | 1/2010 |
| KR | 10-2010-0131756 | 12/2010 |

\* cited by examiner

DISPLAY APPARATUS AND LIGHT SOURCE PACKAGES EMPLOYED THEREIN

CROSS-REFERENCE TO RELATED APPLICATIONS

This U.S. non-provisional patent application claims priority under 35 U.S.C. §119 to Korean Patent Application No. 10-2011-0079179,, filed on Aug. 9, 2011,, the entirety of which is incorporated by reference herein.

BACKGROUND

1. Technical Field

The present disclosure herein relates to a display apparatus and light source packages employed therein.

2. Discussion of Related Art

Display apparatuses may be categorized as, for example, liquid crystal display (LCD) apparatuses or electrophoretic display (EPD) apparatuses. A liquid crystal display apparatus employs a liquid crystal material as a display material, and the electrophoretic display apparatus employs a colloid material as a display material. Liquid crystal material and colloid material do not have light emitting properties. Accordingly, the LCD apparatus and the EPD apparatus need a light source, for example, a back light unit, to obtain brightness of a display panel of a display apparatus.

A back light unit may include a light source generating light and a light guide plate (LGP) directing the light from the light source to the display panel of the display apparatus. Back light units have employed light emitting diodes (LEDs) mounted on a printed circuit board as the light source. The light emitting diodes may be spaced apart from the light guide plate to prevent the light guide plate from being deformed due to heat from the light emitting diodes. That is, the light guide plate may be spaced apart from a printed circuit board on which the light emitting diodes are mounted. Thus, there may be some limitations in fabricating a thin and slim display apparatus.

SUMMARY

Exemplary embodiments are directed to a display apparatus and light source packages employed therein.

In an exemplary embodiment, the display apparatus includes a light source package generating light, a circuit board including a recessed region in which the light source package is disposed, a display panel displaying images, and a light guide plate directing the light generated from the light source package onto the display panel. The light guide plate includes a top surface, a bottom surface and a plurality of sidewall surfaces. One of the sidewall surfaces of the light guide plate is a light incident surface on which the light from the light source package is irradiated. A distance between the light source package and the light incident surface is less than a width of the circuit board.

A distance between the light source package and the light incident surface may be less than 0.15 mm.

The recessed region may include a groove formed in a portion of a surface of the circuit board facing the light incident surface.

The light source package may include a mold having a hexahedral shape with surfaces, a light source disposed in the inner space of the mold, a radiation member conducting heat from the light source to an area outside of the mold, and an electrode terminal electrically connecting the light source to an external circuit. The mold may include a window located at one of the surfaces of the mold to expose an inner space of the mold and a plurality of combination portions disposed at another surface of the mold. The light source may emit light through the window. The radiation member may include a first connection part that combines with the mold through one of the combination portions and a second connection part that contacts the circuit board. The electrode terminal may include a first lead frame and a second lead frame. The lead frames may combine with the mold through the combination portions other than the combination portion corresponding to the radiation member.

The plurality of combination portions may include a first combination portion, a second combination portion and a third combination portion.

Each of the combination portions may include a groove formed at one of the surfaces of the mold, which is opposite to the window.

The plurality of combination portions may be through holes penetrating a top plate of the mold, which is perpendicular to the window.

Each of the lead frames may include a light source connection part inserted into one of the first and second combination portions, and a circuit connection part extending from an end portion of the light source connection part in a horizontal direction. The circuit connection part may be electrically connected to the external circuit.

The radiation member may include a mold insertion part combined with the third combination portion and a heat radiation part extending from an end portion of the mold insertion part in a horizontal direction to conduct heat generated from the light source to the circuit board. A portion of the mold insertion part may be exposed to the inner space of the mold, and the light source may be mounted on a surface of the mold insertion part to face the light guide plate.

The circuit board may include a base substrate formed of a metal material, an insulation layer disposed on the base substrate, conductive patterns disposed on the insulation layer, a passivation layer disposed on the conductive patterns, and including openings to expose portions of the conductive patterns, and a recessed region penetrating the insulation layer and extending into the base substrate. The light source package may include a light emitting diode chip, a mold providing an inner space in which the light emitting diode chip is mounted, a pair of lead frames electrically connected to the light emitting diode chip, and a radiation member contacting the base substrate to radiate heat generated from the light emitting diode chip. One end portion of each of the lead frames may be electrically connected to the light emitting diode chip, and the other end portion of each of the lead frames may be electrically connected to one of the conductive patterns.

The display apparatus may further include a driver integrated circuit generating output control signals that control the display panel and the light source package.

In another exemplary embodiment, the display apparatus includes a display panel displaying images, a light source portion including a light source package generating light and a recessed region in which the light source package is disposed, and a light guide plate directing the light generated from the light source package into the display panel. The light guide plate may include a top surface, a bottom surface receiving the light from the light source package, and at least one sidewall surface connecting the top surface to the bottom surface. A distance between the light source package and the bottom surface of the light guide plate may be less than a width of the light source portion.

In another exemplary embodiment, the light source package includes a mold having a hexahedral shape with surfaces, a light source disposed in the inner space of the mold, a radiation member combined with the mold, and an electrode terminal electrically connecting the light source to an external circuit. The mold may include a window located at one of the surfaces of the mold to expose an inner space of the mold and a plurality of combination portions disposed at another surface of the mold. The light source emits light through the window. The radiation member may combine with the mold through one of the combination portions to conduct heat from the light source toward an area outside of the mold. The electrode terminal may include a first lead frame and a second lead frame. The lead frames may combine with the mold through the combination portions other than the combination portion corresponding to the radiation member.

A display apparatus, according to an embodiment of the present invention, comprises a light guide plate, a circuit board positioned against a light incident surface of the light guide plate, wherein the circuit board includes a plurality of recessed regions facing the light incident surface, and a plurality light source packages respectively positioned in the recessed regions and including respective light sources facing the light incident surface, wherein a heat radiation member is connected to each light source package to radiate heat from the light sources away from the light guide plate.

The radiation member may contact the circuit board.

BRIEF DESCRIPTION OF THE DRAWINGS

The embodiments of the disclosure will become more apparent in view of the attached drawings and accompanying detailed description.

DETAILED DESCRIPTION OF THE EMBODIMENTS

Exemplary embodiments will be described hereinafter in detail with reference to the accompanying drawings.

Figure 1:
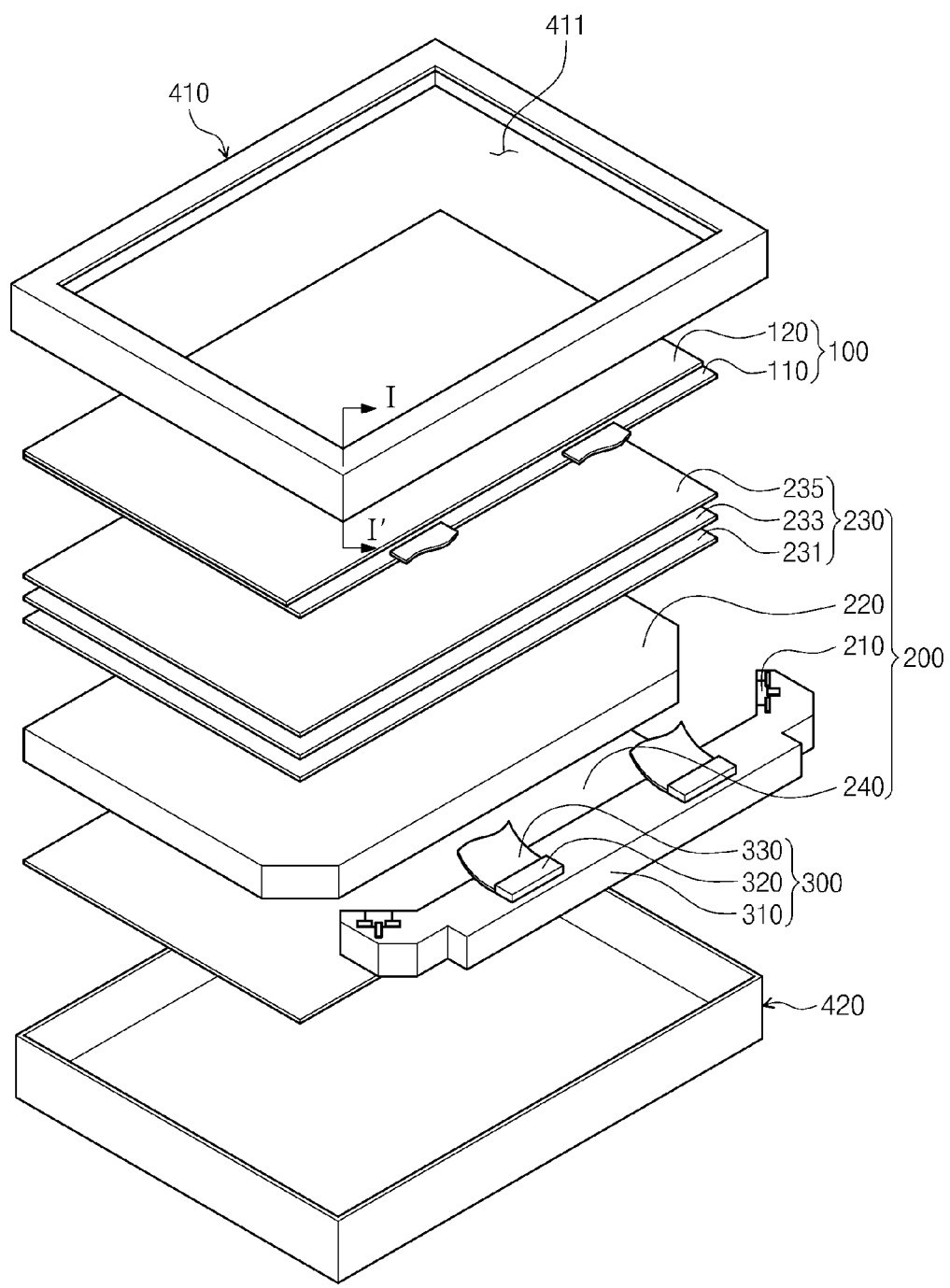
FIG. 1 is an exploded perspective view illustrating a display apparatus according to an exemplary embodiment.
Figure 2:
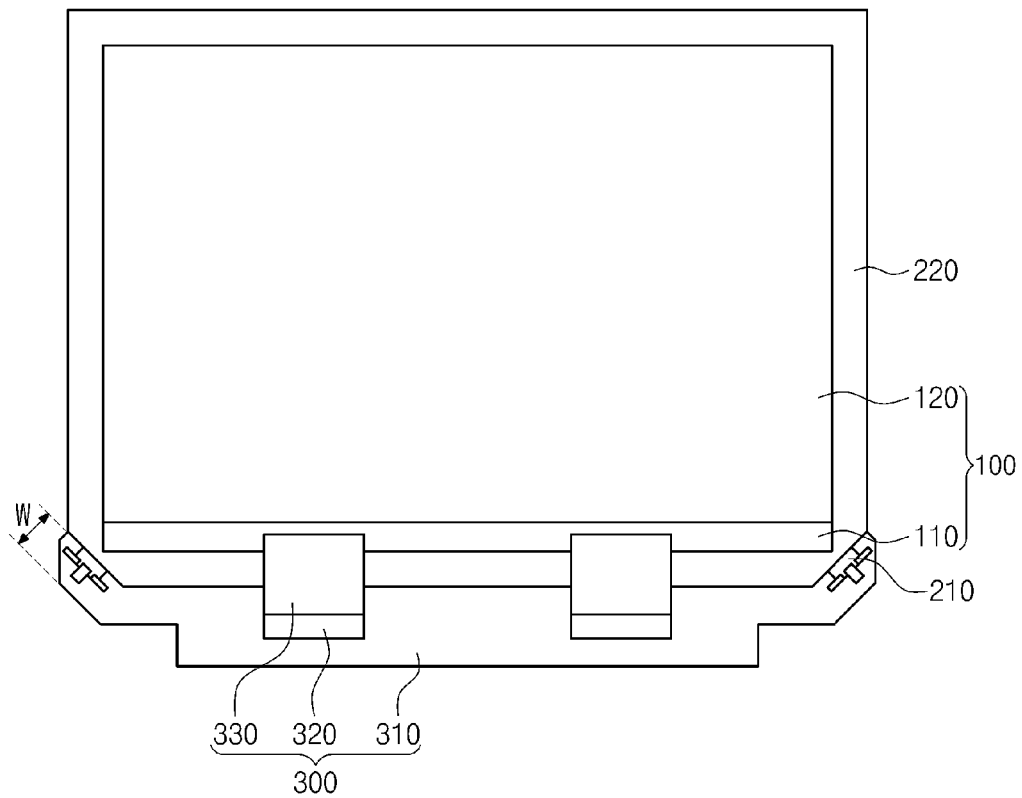
FIG. 2 is a plan view illustrating a display panel, a back light unit and a driving circuit portion of the display apparatus illustrated in FIG. 1.

FIG. 1 is an exploded perspective view illustrating a display apparatus according to an exemplary embodiment. FIG. 2 is a plan view illustrating a display panel, a back light unit and a driving circuit portion of the display apparatus illustrated in FIG. 1, and FIG. 3 is a cross sectional view taken along a line I-I' of FIG. 1.

Figure 3:
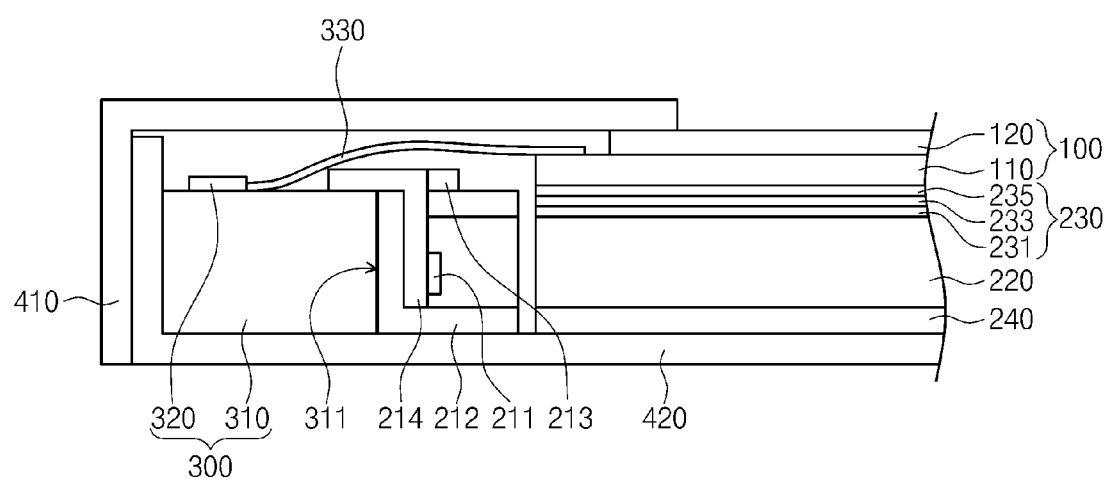
FIG. 3 is a cross sectional view taken along a line I-I' of FIG. 1.

Referring to FIGS. 1, 2 and 3, a display apparatus according to an exemplary embodiment includes a display panel 100, a back light unit 200, a driving circuit portion 300, an upper cover 410 and a lower cover 420. The display panel 100, the back light unit 200 and the driving circuit portion 300 are disposed between the upper cover 410 and the lower cover 420.

The display panel 100 includes a display region displaying an image and displays the image using light. The display panel 100 may include a liquid crystal display panel, an electrophoretic display panel or the like. In the present embodiment, the display panel 100 will be described as the liquid crystal display panel.

According to an embodiment, the display panel 100 is a rectangular-shaped panel having a pair of relatively long sides and a pair of relatively short sides. Further, the display panel 100 includes an array substrate 110 and an opposing substrate 120 facing the array substrate 110, and a liquid crystal layer (not shown) between the array substrate 110 and the opposing substrate 120.

In an embodiment, a plurality of gate lines (not shown) and a plurality of data lines (not shown) are disposed between the array substrate 110 and the liquid crystal layer. The gate lines may extend in a first direction and the data lines extend in a second direction intersecting the first direction. The data lines are electrically insulated from the gate lines. A plurality of pixels (not shown) are disposed between the array substrate 110 and the liquid crystal layer in a matrix form. A thin film transistor (not shown) and a pixel electrode are disposed in each of the pixels. A gate electrode of the thin film transistor is electrically connected to a corresponding one of the gate lines, and a source electrode of the thin film transistor is electrically connected to a corresponding one of the data lines. In addition, a drain electrode of the thin film transistor is electrically connected to the pixel electrode. Thus, the thin film transistor acts as a switching element that controls an electrical connection between the data line and the pixel electrode.

According to an embodiment, color filters (not shown) are disposed on a surface of the opposing substrate 120 and a common electrode (not shown) facing the pixel electrodes is disposed on the color filters. The color filters correspond to RGB color filters including red filters, green filters and blue filters. The RGB color filters are formed using a thin film deposition process. According to an embodiment, the color filters are disposed on the opposing substrate 120, as described above. However, the position where the color filters are disposed is not limited to the surface of the opposing substrate 120. For example, the color filters may be disposed on the array substrate 110 instead of the opposing substrate 120.

In each of the pixels, liquid crystals in the liquid crystal layer are arrayed in a specific direction according to an electrical bias (e.g., a voltage) applied between the corresponding pixel electrode and the common electrode. Thus, the liquid crystals arrayed along the specific direction in each of the pixels controls the permeability of the light from the back light unit 200, thereby displaying an image on the display panel 100.

The back light unit 200 may be disposed to face a surface of the display panel 100, for example, to face a bottom surface of the display panel 100. The back light unit 200 supplies light toward the bottom surface of the display panel 100. Further, according to an embodiment, the light supplied onto the bottom surface of the display panel 100 penetrates the display panel 100 to pass through a top surface of the display panel 100. Thus, an image may be displayed on the display panel 100. The back light unit 200 includes at least one light source package 210 generating and emitting light, a light guide plate 220 introducing the light from the light source package 210 onto the display panel 100, an optical member 230 between the display panel 100 and the light guide plate 220, and a reflection sheet 240.

According to an embodiment, the light source package 210 includes a light source 211 generating light, a mold 212 providing an inner space in which the light source 211 is located, and an electrode terminal 213 for supplying electric power to the light source 211. The light source package 210 further includes a radiation member 214 on which the light source 211 is mounted to radiate heat from the light source 211. According to an embodiment, the light source package 210 is mounted in a part of the driving circuit portion 300. The light source package 210 receives electric power from the driving circuit portion 300 through the electrode terminal 213, thereby generating light from the light source 211. The heat generated from the light source 211 is conducted to a part of the driving circuit portion 300 through the radiation member 214.

According to an embodiment, the light guide plate 220 has a flat plate shape. Alternatively, the light guide plate may have a wedge shape. The light guide plate 220 includes a transparent material which is capable of refracting the light. In an embodiment, the light guide plate 220 includes a transparent polymer resin material, for example, a polycarbonate material or a polymethyl methacrylate material. The light guide plate 220 is disposed under the display panel 100 to introduce the light from the light source package 210 onto the display panel 100. Moreover, the light guide plate 220 overlaps a display region of the display panel 100. The light guide plate 220 includes a top surface, a bottom surface opposite to the top surface, and a plurality of sidewall surfaces connecting the top surface to the bottom surface. The light from the light source package 210 is irradiated onto at least one of the sidewall surfaces of the light guide plate 220, and the light introduced into the light guide plate 220 passes through the top surface of the light guide plate 220 and travels toward the display panel 100.

The optical member 230 is positioned between the light guide plate 220 and the display panel 100. The optical member 230 controls the light that is generated from the light source package 210 and passes through the light guide plate 220. The optical member 230 includes, for example, a diffusion sheet 231, a prism sheet 233 and a protection sheet 235, which are sequentially stacked on the light guide plate 220.

The diffusion sheet 231 diffuses the light from the light guide plate 220. According to an embodiment, rays of the diffused light from the diffusion sheet 231 are concentrated by the prism sheet 233, and travel along a direction perpendicular to the bottom surface of the display panel 100. That is, almost all of the light passing through the prism sheet 233 may be irradiated onto the display panel 100 at a right angle to the display panel. The protection sheet 235 protects the prism sheet 233 from external shocks or impacts.

As described above, the optical member 230 is configured to include the diffusion sheet 231, the prism sheet 233 and the protection sheet 235. However, the configuration of the optical member 230 is not limited to the configuration mentioned above. For example, the optical member 230 may further include at least one additional diffusion sheet, at least one additional prism sheet and/or at least one additional protection sheet in addition to the diffusion sheet 231, the prism sheet 233 and the protection sheet 235. Alternatively, the optical member 230 may be configured to include two diffusion sheets 231, the prism sheet 233 and the protection sheet 235.

The reflection sheet 240 is disposed between the light guide plate 220 and the lower cover 420. Part of rays of the light from the light source package 210 may be scattered to travel toward the lower cover 420. These scattered rays are reflected by the reflection sheet 240 to travel toward the light guide plate 220. Thus, the reflection sheet 240 reduces the loss of light from the light source package 210 to enhance the display efficiency of the display apparatus. The reflection sheet 240 includes a material that reflects light. As a result, the reflection sheet 240 increases the amount of the light that travels toward the display panel 100.

The driving circuit portion 300 includes a circuit board 310 and a driver integrated circuit 320 mounted on the circuit board 310.

The circuit board 310 includes a recessed region 311 therein, and the light source package 210 is mounted in the recessed region 311. In more detail, according to an embodiment, the circuit board 310 is formed as a flat plate that extends along first sides of the display panel 100 and the light guide plate 220. The circuit board 310 includes a top surface, a bottom surface, and a plurality of sidewall surfaces connecting the top surface to the bottom surface. Referring, for example, to FIG. 2, the recessed region 311 is an empty groove where a portion of one of the sidewall surfaces of the circuit board 310, adjacent to the display panel 100, is recessed to accommodate the light source package 210. Thus, the light source package 210 is not mounted on the top and bottom surfaces of the circuit board 310 but mounted in the sidewall of the circuit board 310 adjacent to the display panel 100. According to an embodiment, the light source package 210 is electrically connected to the circuit board 310 through an electrode terminal 213. The light source 211 is mounted on a radiation member 214 and the radiation member 214 is in contact with a portion of the circuit board 310. Thus, the radiation member 214 conducts heat generated from the light source 211 to the circuit board 310.

The driver integrated circuit 320 receives external signals and generates output control signals that control the display panel 100 and the light source package 210 in response to the external signals. The output control signals for controlling the display panel 100 are transmitted to the display panel 100 through a flexible printed circuit (FPC) board 330.

As described above, the driver integrated circuit 320 is mounted on the circuit board 310 and the output control signals of the driver integrated circuit 320 are transmitted to the display panel 100 through the flexible printed circuit (FPC) board 330. It is to be noted that the configuration of the driver integrated circuit 320 and the relationship between the driver integrated circuit 320 and the display panel 100 is not limited to the descriptions mentioned above. For example, the output control signals of the driver integrated circuit 320 may be transmitted to the display panel 100 through a tape carrier package TCP in which the driver integrated circuit 320 is mounted.

The upper cover 410 is disposed on the display panel 100, and the upper cover 410 is configured to correspond to a shape of the display panel 100. The upper cover 10 includes a display window 411 that exposes the display region of the display panel 100. Further, the upper cover 410 includes an edge portion covering and supporting top edges of the display panel 100 and a plurality of upper cover sidewalls downwardly extending from the edge portion. In an embodiment, the display panel 100 has a rectangular shape in a plan view. Thus, the upper cover 410 includes four upper cover sidewalls. The upper cover 410 is combined with the lower cover 420 to support and surround the edges of the display panel 100.

The lower cover 420 is disposed under the back light unit 200. The lower cover 420 includes a bottom portion corresponding to shapes of the display panel 100 and the back light unit 200, and a plurality of lower cover sidewalls upwardly extending from edges of the bottom portion. In an embodiment, the display panel 100 has a rectangular shape in a plan view. Thus, the lower cover 420 includes four lower cover sidewalls. The display panel 100 and the back light unit 200 are disposed in an empty space which is defined by the bottom portion and the lower cover sidewalls of the lower cover 420. The upper cover 410 and the lower cover 420 are combined with each other to provide an inner space, and the display panel 100 and the back light unit 200 are disposed in the inner space defined by the upper cover 410 and the lower cover 420.

According to the display apparatus described above, the light source package 210 is disposed in the recessed region 311 of the circuit board 310. According to an embodiment, a distance between the light source package 210 and the sidewall surface of the light guide plate 220 adjacent to the light source package 210 is equal to or less than about 0.15 mm. Further, the distance between the light source package 210 and the sidewall surface of the light guide plate 220 adjacent to the light source package 210 is equal to or greater than a distance between the circuit board 310 and the sidewall surface of the light guide plate 220 adjacent to the light source package 210. As a result, the distance between the light source package 210 and the sidewall surface of the light guide plate 220 adjacent to the light source package 210 is minimized to result in a slim display apparatus. For example, since the light source package 210 is positioned in a recessed region of the circuit board 310, the light source package 210 is able to be close to the sidewall surface of the light guide plate 220 when the circuit board 310 is positioned against the light guide plate 220. According to an embodiment, because the light source package 210 is formed in part of the circuit board 310, the distance of the light source package 210 from the light guide plate 220 is less than a width W of the circuit board 310 measured between an edge of the circuit board 310 adjacent the light guide plate 220, and an external edge of the circuit board 310 opposing the edge adjacent to the light guide plate 220.

Figure 4A:
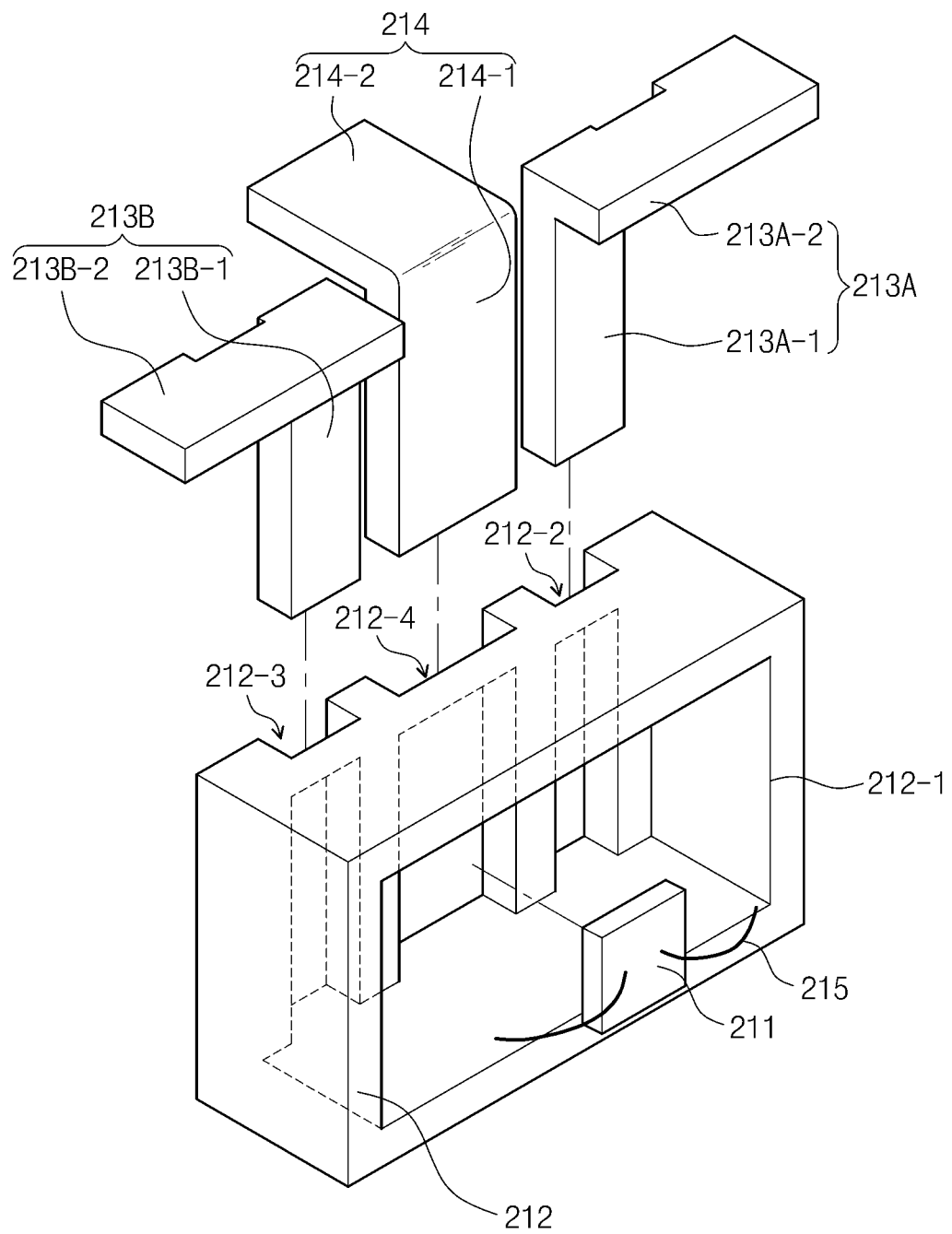
FIGS. 4A to 4C and 5A to 5C are schematic drawings illustrating light source packages which can be applied to the display apparatus of FIG. 1.
Figure 4B:
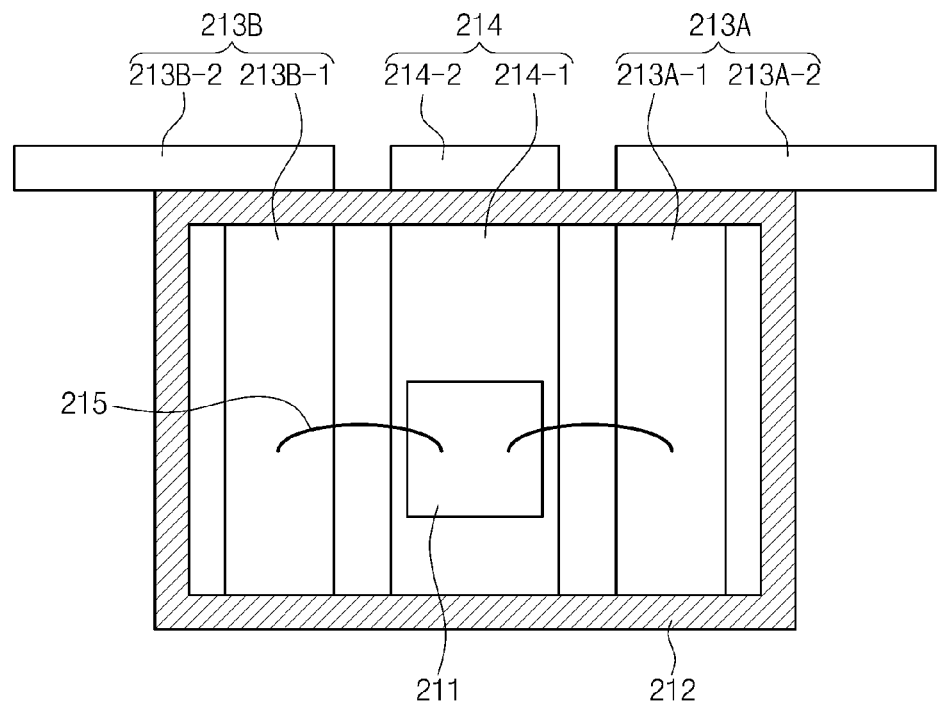
Figure 4C:
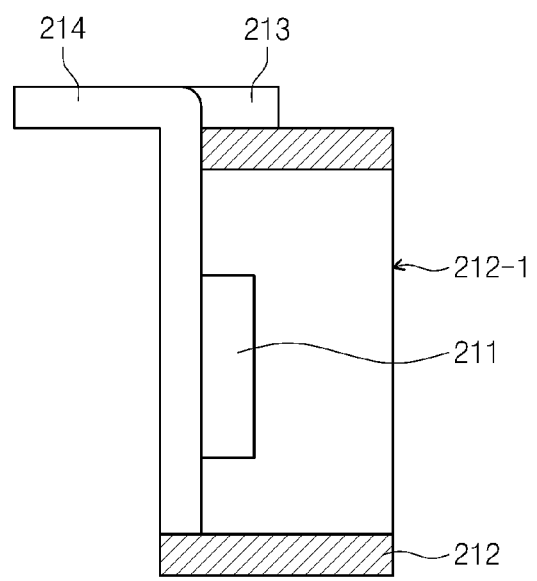
Figure 5A:
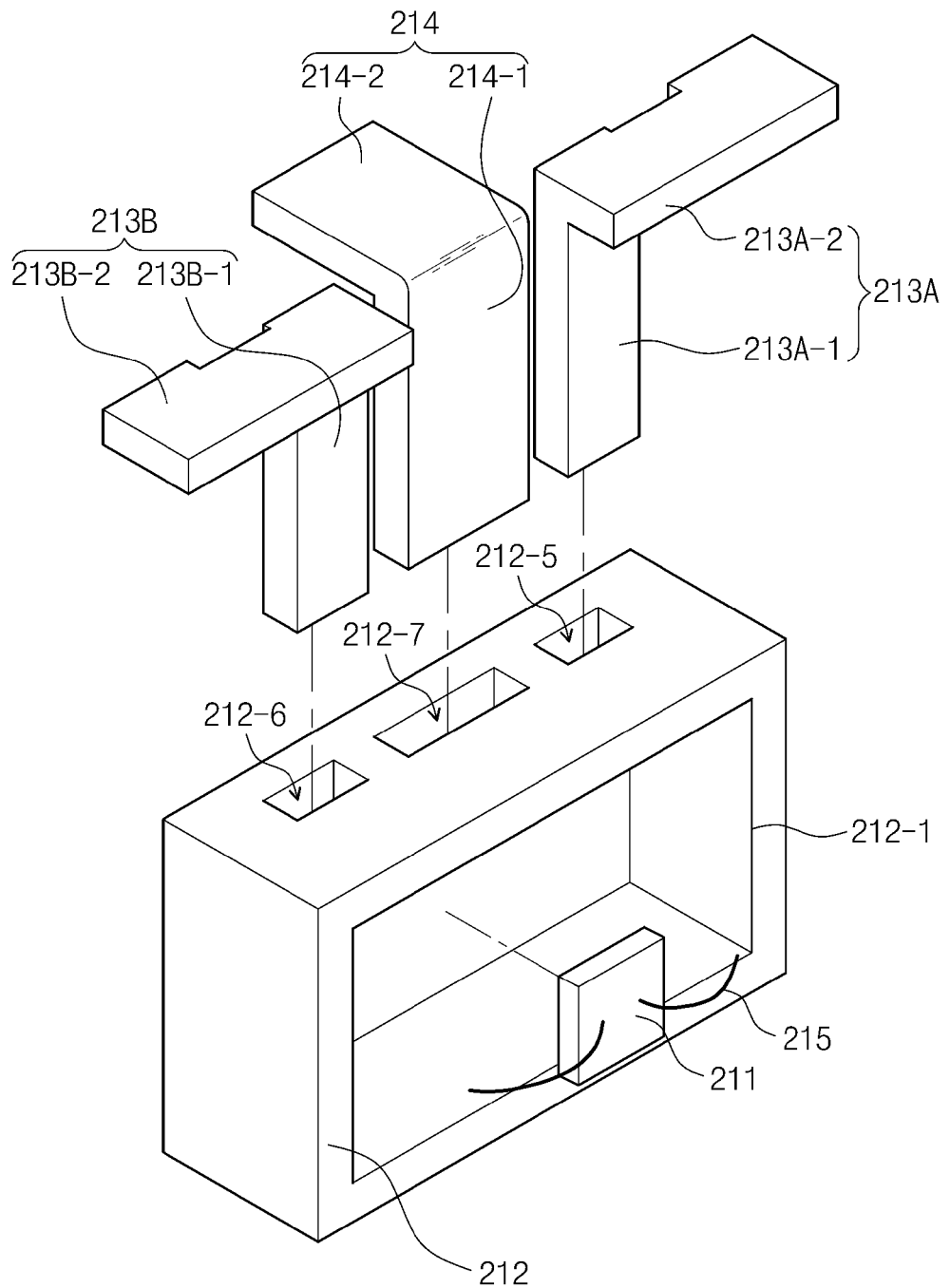
Figure 5B:
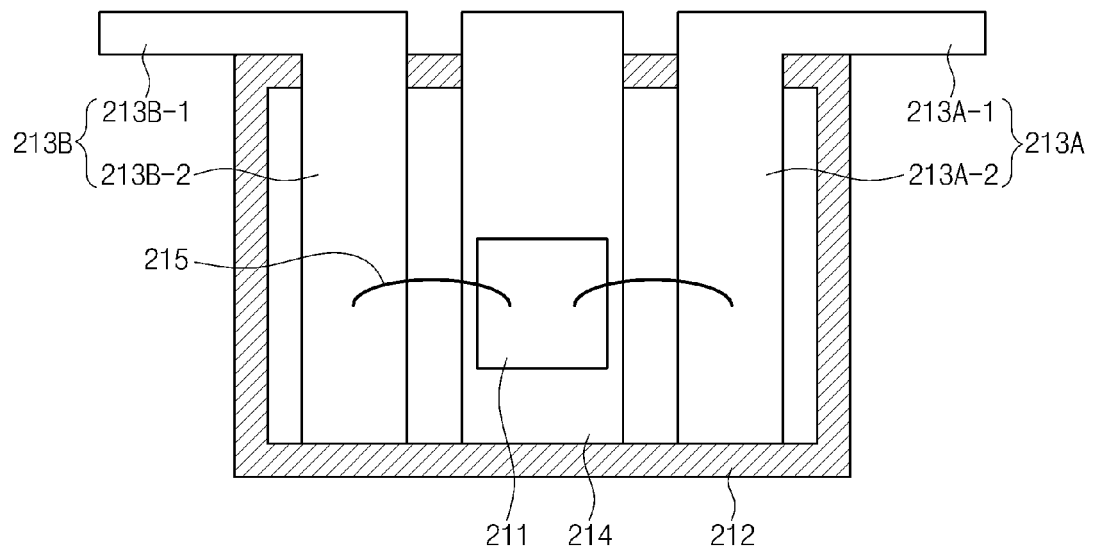
Figure 5C:
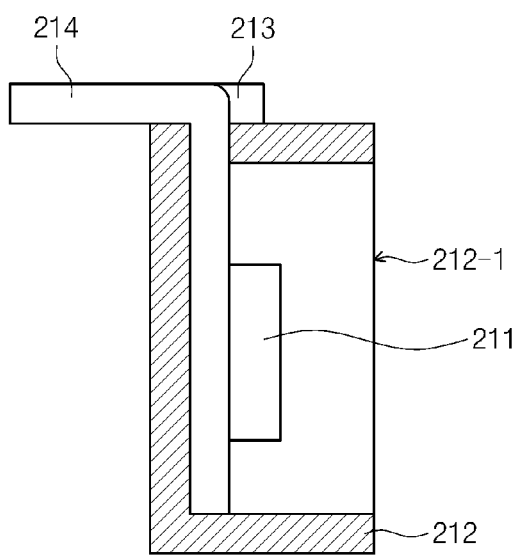

FIGS. 4A to 4C and FIGS. 5A to 5C illustrate various light source packages which may be applied to the display apparatus of FIG. 1. FIGS. 4A and 5A are exploded perspective views illustrating light source packages, FIGS. 4B and 5B are vertical cross sectional views taken along a plane parallel with windows 212-1 of the FIGS. 4A and 5A, respectively. Further, FIGS. 4C and 5C are planar cross sectional views taken along a plane perpendicular to windows 212-1 of FIGS. 4A and 5A, respectively.

Referring to FIGS. 4A, 4B and 4C, a light source package 210 includes a light source 211 generating light, a mold 212 providing an inner space in which the light source 211 is located, and an electrode terminal 213, including lead frames 213A and 213B, for supplying electric power to the light source 211. The light source package 210 further includes a radiation member 214 on which the light source 211 is mounted to radiate heat from the light source 211.

The light source package 210 receives electric power from the driving circuit portion 300 through the electrode terminal 213, thereby generating light from the light source 211. In an embodiment, the light source 211 is a light emitting diode (LED).

According to an embodiment, the mold 212 has a hexahedral shape with an inner space therein. The mold 212 includes a window 212-1 exposing the inner space thereof. That is, the inner space of the mold 212 is spatially connected to a space outside of the mold 212 through the window 212-1. Inner surfaces of the mold 212 reflect the light from the light source 211 to enhance the light efficiency of the light source package 210. In addition, the mold 212 includes a plurality of combination portions 212-2, 212-3 and 212-4, which are disposed at a surface where the window 212-1 is not disposed. For example, the mold 212 includes first, second and third combination portions 212-2, 212-3 and 212-4, and each of the combination portions 212-2, 212-3 and 212-4 is a groove formed at a rear surface opposite to the window 212-1. A portion of each of the combination portions 212-2, 212-3 and 212-4 spatially connects the inner space of the mold 212 to a space outside of the mold 212.

The electrode terminal 213 includes a first lead frame 213A and a second lead frame 213B, and each of the first and second lead frames 213A and 213B includes a light source connection part 213A-1 or 213B-1 and a printed circuit board (PCB) connection part 213A-2 or 213B-2. According to an embodiment, each of the light source connection parts 213A-1 and 213B-1 has a plate shape. Each of the light source connection parts 213A-1 and 213B-1 is inserted into one of the combination portions 212-2, 212-3 and 212-4 to combine with the mold 212. For example, according to the present embodiment, the light source connection part 213A-1 of the first lead frame 213A is inserted into the first combination portion 212-2 to combine with the mold 212, and the light source connection part 213B-1 of the second lead frame 213B is inserted into the second combination portion 212-3 to combine with the mold 212. A portion of each of the light source connection parts 213A-1 and 213B-1 is exposed in the inner space of the mold 212. The light source connection parts 213A-1 and 213B-1 are electrically connected to the light source 211 through wires 215.

Referring, for example, to FIGS. 4A and 4B, the PCB connection parts 213A-2 and 213B-2 extend from respective ends of the light source connection parts 213A-1 and 213B-1 in a horizontal direction. According to an embodiment, each of the first and second lead frames 213A and 213B has a bent shape. For example, the lead frames 213A and 213B are bent at a 90 degree angle, but the bend angle is not limited thereto. The PCB connection parts 213A-2 and 213B-2 are electrically connected to circuits outside of the light source package 210. For example, the PCB connection parts 213A-2 and 213B-2 are electrically connected to the circuit board 310 of the driving circuit portion 300.

The radiation member 214 is formed of a material having good thermal conductivity. The radiation member 214 includes a mold insertion part 214-1 and a heat radiation part 214-2.

According to an embodiment, the mold insertion part 214-1 has a plate shape. The mold insertion part 214-1 is inserted into one of the combination portions 212-2, 212-3 and 212-4, for example, the third combination portion 212-4, to combine with the mold 212. The light source 211 is mounted on a surface of the mold insertion part 214-1 to face the light guide plate 220.

The heat radiation part 214-2 contacts the circuit board 310 to conduct the heat generated from the light source 211 to the circuit board 310. Referring, for example, to FIGS. 4A and 4C, the heat radiation part 214-2 extends from an end of the mold insertion part 214-1 in a horizontal direction. That is, the radiation member 214 may have a bent shape. For example, the radiation member 214 is bent at a 90, degree angle, but the bend angle is not limited thereto.

Referring to FIGS. 5A, 5B and 5C, the mold 212 includes a plurality of combination portions 212-5, 212-6 and 212-7 which are disposed at a surface of the mold other than where the window 212-1 is located. For example, the mold 212 includes first, second and third combination portions 212-5, 212-6 and 212-7 which are disposed in a top plate having a top surface perpendicular to the window 212-1. Each of the combination portions 212-5, 212-6 and 212-7 is a through hole penetrating the top plate. Each of the combination portions 212-5, 212-6 and 212-7 spatially connect the inner space of the mold 212 to a space outside of the mold 212.

Each of the light source connection parts 213A-1 and 213B-1 are inserted into one of the combination portions 212-5, 212-6 and 212-7 to combine with the mold 212. For example, according to the present embodiment, the light source connection part 213A-1 of the first lead frame 213A is inserted into the first combination portion 212-5 to combine with the mold 212, and the light source connection part 213B-1 of the second lead frame 213B is inserted into the second combination portion 212-6 to combine with the mold 212.

The mold insertion part 214-1 of the radiation member 214 is inserted into one of the combination portions 212-5, 212-6 and 212-7, for example, the third combination portion 212-7 to combine with the mold 212.

The display apparatus including at least one of the light source packages 210 described herein is configured so that the light source package 210 is mounted in the recessed region 311 of the circuit board 310. Thus, the distance between the circuit board 310 and the light guide plate 220 can be minimized. Further, the radiation member 214 of the light source package 210 may directly contact a portion of the circuit board 310. Thus, the heat generated from the light source 211 can be effectively radiated. According to embodiments, a distance between the light source package 210 and the light guide plate 220 can be reduced, and, according to an embodiment, may be zero, while the display apparatus effectively radiates the heat from the light source 211. As a result, a slim display apparatus can be realized.

According to embodiments, the light source package 210 is mounted in the recessed region 311 of the circuit board 310 of the driving circuit portion 300. Thus, an additional circuit board for mounting the light source package 210 is not required. As a result, the thickness of the display apparatus can be further reduced.

Figure 6:
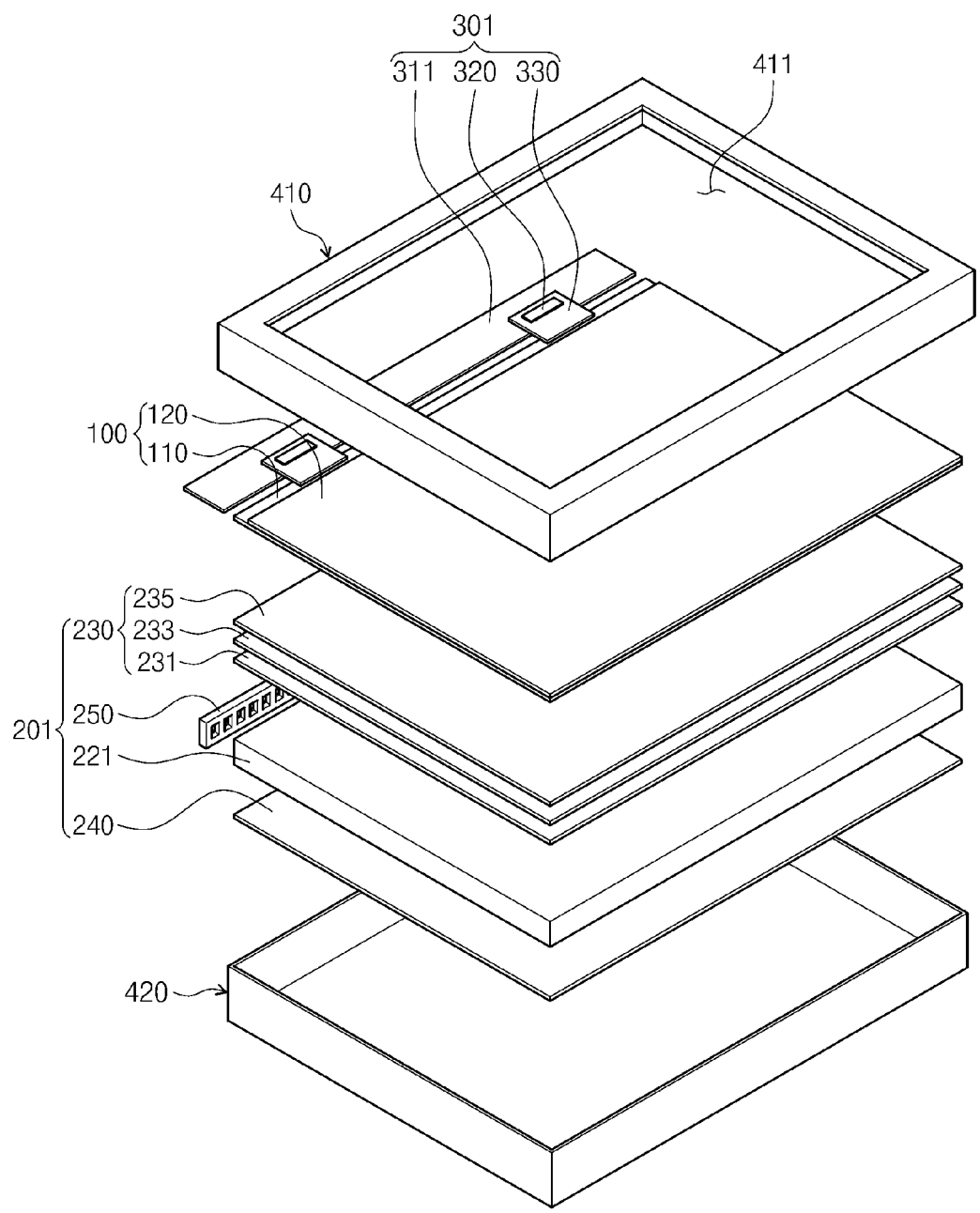
FIG. 6 is an exploded perspective view illustrating a display apparatus according to another exemplary embodiment.
Figure 7:
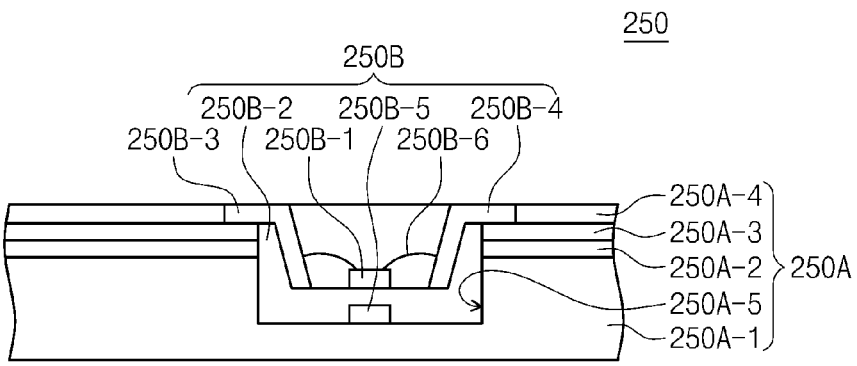
FIG. 7 is a cross sectional view illustrating a light source of FIG. 6.
Figure 8:
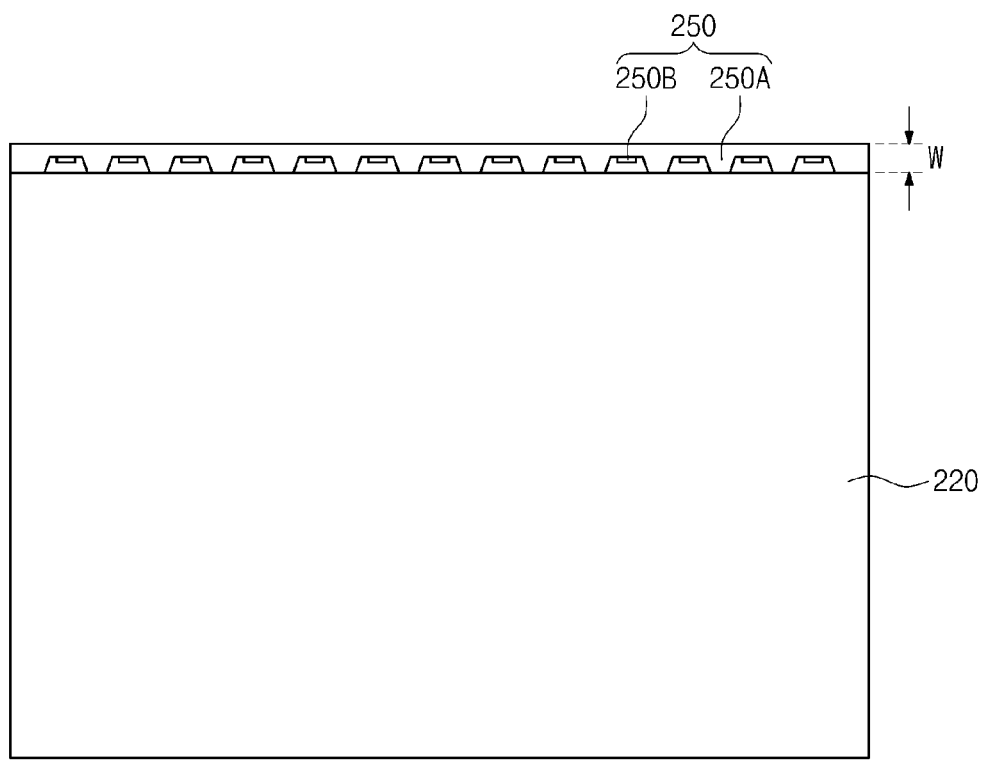
FIG. 8 is a plan view illustrating a light source and a light guide plate of FIG. 6.

A display apparatus according to another exemplary embodiment is described with reference to FIGS. 6, 7 and 8. FIG. 6 is an exploded perspective view illustrating a display apparatus according to another exemplary embodiment. FIG. 7 is a cross sectional view illustrating a light source of FIG. 6, and FIG. 8 is a plan view illustrating a light source and a light guide plate of FIG. 6. To avoid duplicate explanations, descriptions to the same or similar elements as set forth in the embodiments illustrated in FIGS. 1 to 5 may be omitted or briefly mentioned in this embodiment. Like reference numbers may refer to like elements throughout.

Referring to FIGS. 6, 7 and 8, a display apparatus according to the present embodiment includes a display panel 100, a back light unit 201, a driving circuit portion 301, an upper cover 410 and a lower cover 420. A driving circuit portion 301 is disposed at one side of the display panel 100 and is connected to the display panel 100. The driving circuit portion 301 includes a circuit board 311 and a driver integrated circuit 320 mounted on the circuit board 311, and output control signals of the driver integrated circuit 320 are transmitted to the display panel 100 through a signal transmission member 330, for example, a flexible printed circuit (FPC) board or a tape carrier package TCP.

The back light unit 201 includes a light source portion 250, a light guide plate 221 directing light generated from the light source portion 250 onto the display panel 100, an optical member 230 between the display panel 100 and the lower cover 420, and a reflection sheet 240.

The light source portion 250 includes a circuit board 250A having a plurality of recessed regions 250A-5 and a plurality of light source packages 250B disposed in respective ones recessed regions 250A-5. A surface including the recessed regions 250A-5 faces a light incident surface of the light guide plate 220.

According to an embodiment, the circuit board 250A includes a base substrate 250A-1, an insulation layer 250A-2 disposed on the base substrate 250A-1, conductive patterns 250A-3 disposed on the insulation layer 250A-2, so that the insulation layer 250A-2 is between the conductive patterns 250A-3 and the base substrate 250A-1. A passivation layer 250A-4 including openings exposing portions of the conductive patterns 250A-3 is disposed on the conductive patterns 250A-3. According to an embodiment, the base substrate 250A-1 may be a metal substrate having a good thermal conductivity, for example, an aluminum substrate. According to an embodiment, each of the conductive patterns 250A-3 may be a metal pattern having good electrical conductivity, for example, a copper pattern. The circuit board 250A includes the plurality of recessed regions 250A-5 having a trench shape. In an embodiment, each of the recessed regions 250A-5 penetrates the insulation layer 250A-2 and extends into the base substrate 250A-1.

Each of the light source packages 250B includes a light emitting diode (LED) chip 250B-1, a mold 250B-2 providing an inner space in which the LED chip 250B-1 is mounted and forming an outward shape of the light source packages 250B, a pair of lead frames 250B-3 and 250B-4 electrically connected to the LED chip 250B-1 through wires 250B-6, and a radiation member 250B-5 radiating heat generated from the LED chip 250B-1. An end portion of each of the lead frames 250B-3 and 250B-4 is connected to one of the wires, and the other end portion of each of the lead frames 250B-3 and 250B-4 is connected to one of the conductive patterns 250A-3. The radiation member 250B-5 contacts the base substrate 250A-1 to radiate the heat generated from the LED chip 250B-1.

In the light source portion 250 described above, the light source packages 250B are disposed and mounted in respective recessed regions 250A-5 of the circuit board 250A, and the light source portion 250 generates light toward a light incident surface of the light guide plate 220. Thus, a distance between the circuit board 250A and the light guide plate 220 can be minimized since the light source packages 250B are mounted and disposed in respective recessed regions 250A-5 of the circuit board 250A. A distance between the light source packages 250B and the light guide plate 220 can be reduced or, according to an embodiment, may be zero, thereby resulting in a slim display apparatus. For example, since the light source packages 250B are positioned in recessed regions 250A-5 of the circuit board 250A, the light source packages 250B are able to be close to the bottom surface of the light guide plate 220 when the circuit board 250A is positioned against the light guide plate 220. According to an embodiment, because the light source packages 250B is formed in part of the circuit board 250A, the distance of the light source packages 250B from the light guide plate 220 is less than a width W of the circuit board 250A measured between an edge of the circuit board 250A adjacent the light guide plate 220, and an external edge of the circuit board 250A opposing the edge adjacent to the light guide plate 220.

Figure 9:
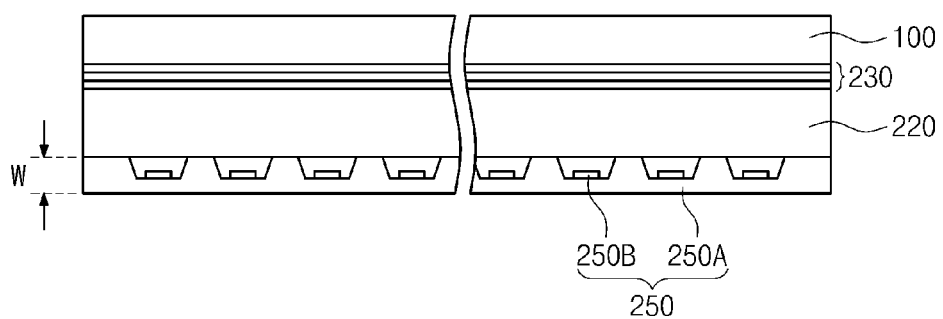
FIG. 9 is a cross sectional view illustrating a display apparatus according to another exemplary embodiment.

A display apparatus according to another exemplary embodiment is described with reference to FIG. 9. FIG. 9 is a cross sectional view illustrating a display apparatus according to another exemplary embodiment. Descriptions of the same or similar elements as set forth in the embodiments illustrated in FIGS. 1 to 8 may be omitted or briefly mentioned in the present embodiment. The same reference numbers as used in the previous embodiments may refer to the same elements.

Referring to FIG. 9, a display apparatus according to the present embodiment includes a display panel 100, a light guide plate 220, and an optical member 230 between the display panel 100 and the light guide plate 220. The display apparatus further includes a light source portion 250 disposed on a bottom surface of the light guide plate 220 on a side of the light guide plate 220 opposite to that on which the optical member 230 is located.

The bottom surface of the light guide plate 220 functions as the light incident surface of the light guide plate 220. Thus, the light from the light source portion 250 is irradiated onto the bottom surface of the light guide plate 220, and the light transmitted into the light guide plate 220 passes through a top surface of the light guide plate 220 and travels toward the display panel 100. In other words, the light source portion 250 is disposed under the light guide plate 220. Although not shown in FIG. 9, the display apparatus according to the present embodiment may further include a reflection sheet disposed under the light source portion 250 on a side of the light source portion opposite to that on which the light guide plate 220 is located. A part of rays of the light from the light source portion 250 may be scattered so as not to travel toward the bottom surface of the light guide plate 220. These scattered rays of the light are reflected by the reflection sheet to travel toward the bottom surface of light guide plate 220. Thus, the reflection sheet reduces the loss of the light from the light source portion 250 to enhance the display efficiency of the display apparatus.

The light source portion 250 includes a circuit board 250A having a plurality of recessed regions (250A-5 of FIG. 7) and a plurality of light source packages 250B disposed in respective recessed regions 250A-5.

A top surface of the circuit board 250A including the recessed regions 250A-5 faces a light incident surface (e.g., a side surface in FIG. 8, and the bottom surface in FIG. 9) of the light guide plate 220, and the light source packages 250B are disposed in the recessed regions 250A-5 to emit lights toward the light guide plate 220.

In the light source portion 250 described above, the light source packages 250B are disposed and mounted in respective recessed regions 250A-5 of the circuit board 250A, and the light source portion 250 emits light toward the light incident surface of the light guide plate 220. Thus, a distance between the circuit board 250A and the light guide plate 220 can be minimized since the light source packages 250B are mounted and disposed in respective recessed regions 250A-5 of the circuit board 250A. A distance between the light source packages 250B and the light guide plate 220 can be reduced or, according to an embodiment, may be zero, thereby realizing a display apparatus with a thin profile.

Figure 10:
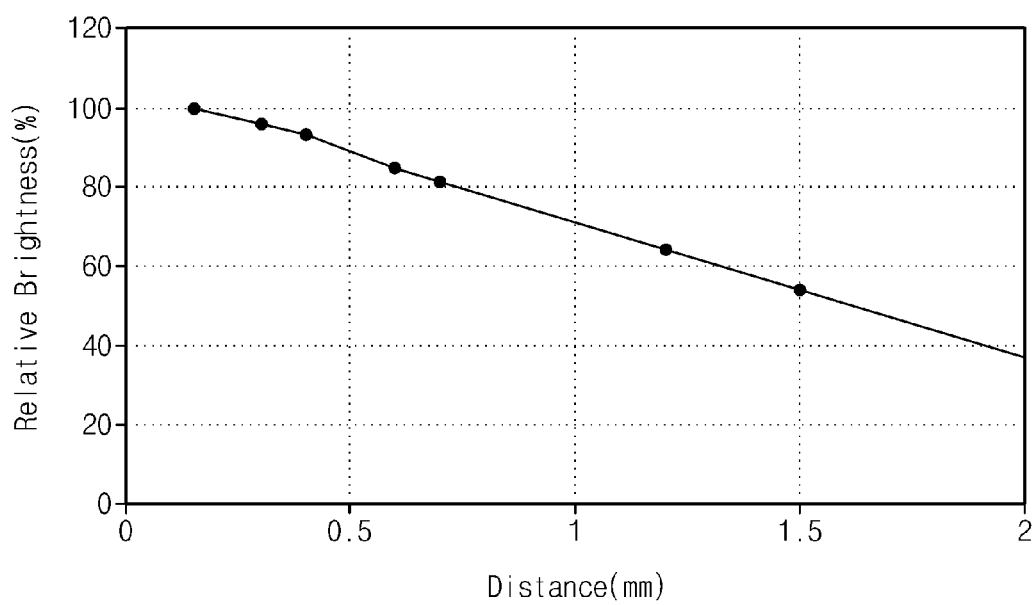
FIG. 10 is a graph illustrating a relative brightness of a display apparatus according to a distance between a light source and a light guide plate.

FIG. 10 is a graph illustrating a relative brightness of the display apparatus illustrated in FIG. 9 according to a distance between the light source package and the light guide plate. Measured values of the relative brightness illustrated in FIG. 10 are listed in the following Table 1. A reference value of the relative brightness is a brightness of the display apparatus when the distance between the light source package and the light guide plate is 0.15 mm.

TABLE 1

| Distance (mm) | Relative Brightness (%) | Variation rate of Relative Brightness (%) |
|---|---|---|
| 0 | 107 | +7 |
| 0.15 | 100 | 0 |
| 0.30 | 96 | −4 |
| 0.40 | 93 | −7 |
| 0.60 | 84 | −16 |
| 0.70 | 82 | −18 |
| 1.20 | 66 | −34 |
| 1.50 | 54 | −46 |

Referring to FIG. 10 and Table 1,, the relative brightness is reduced with increasing distance between the light source package and the light guide plate. The relative brightness when the distance between the light source package and the light guide plate is less than 0.15 mm is increased as compared with the relative brightness when the distance between the light source package and the light guide plate is 0.15 mm. The amount of rays of light incident on the light guide plate is reduced with increase of the distance between the light source package and the light guide plate. Thus, the distance between the light source package and the light guide plate is reduced in order to improve the display efficiency of the display apparatus.

In the event that the distance between the light source package and the light guide plate is reduced, the light guide plate may be deformed due to heat generated from light sources of the light source portion. However, according to the embodiments described above, the light sources are disposed in the recessed regions of the circuit board and the heat from the light sources is directed away from the light guide plate by radiation portions. Thus, even though the distance between the light source package and the light guide plate is reduced, the heat generated from the light sources may be directly conducted to the circuit board to prevent the light guide plate from being deformed. As a result, a slim display apparatus can be realized without deformation of the light guide plate.

While the inventive concept has been described with reference to exemplary embodiments, it will be apparent to those skilled in the art that various changes and modifications may be made without departing from the spirit and scope of the inventive concept.

What is claimed is:

1. A display apparatus comprising:
    a light source package having a light emitting diode chip, and a mold including an inner space in which the light emitting diode chip is mounted;
    a circuit board including a top surface, a bottom surface, and a plurality of sidewall surfaces connecting the top surface to the bottom surface, and a recessed region in which the light source package is disposed and wherein the recessed region is recessed from at least one of the sidewall surfaces;
    a display panel;
    a light guide plate disposed under the display panel and facing at least one of the sidewall surfaces of the circuit board; and
    a driver integrated circuit disposed on the circuit board, and generating control signals that control the display panel and the light source package, wherein the light guide plate includes a top surface, a bottom surface, and a plurality of sidewall surfaces, a pair of corners of the light guide plate being truncated, wherein a truncated sidewall surface of the plurality of sidewall surfaces is a light incident surface on which light from the light source package is emitted, wherein the recessed region faces the light incident surface, and wherein a distance between the light source package and the light incident surface is equal or longer than a distance between the sidewall surface of the circuit board facing the light incident surface and the light incident surface.

2. The display apparatus of claim 1, wherein the distance between the light source package and the light incident surface is less than 0.15 mm.

3. The display apparatus of claim 1,
wherein the plurality of sidewall surfaces comprises:
a first sidewall surface facing one of the pair of corners of the light guide plate being truncated and having a first recessed region,
a second sidewall surface facing the other one of the pair of corners of the light guide plate being truncated and having a second recessed region, and
a third sidewall surface connecting between the first sidewall the and the second sidewall surface and the third sidewall surface facing the light guide plate, and
wherein the first sidewall surface and the second sidewall surface are bent from the third sidewall surface to the sidewalls truncated of the light guide plate.

4. The display apparatus of claim 3, wherein the mold is inserted in the recessed region and comprises a plurality of sidewalls surrounding an inner space and a plurality of combination portions connecting the sidewalls, and
the light source package further includes:
a window exposing the inner space of the mold and facing the light incident surface;
a radiation member conducting heat from the light source toward an outside of the mold, the radiation member including a first connection part combined with the mold through a first combination portion of the combination portions and a second connection part that extends outside of the one of the combination portions and contacts the top surface of the circuit board; and
an electrode terminal electrically connecting the light source to an external circuit, the electrode terminal including a first lead frame and a second lead frame, wherein the first and second lead frames combine respectively with the mold through a second combination portion and a third combination portion of the combination portions which are different from the first combination portion.

5. The display apparatus of claim 4, wherein the external circuit is disposed on the top surface of the circuit board.

6. The display apparatus of claim 4, wherein each of the combination portions is a groove formed at a surface of the mold located opposite to the window.

7. The display apparatus of claim 4, wherein the plurality of combination portions are each through holes penetrating one of the sidewalls of the mold, the sidewall parallel to the top surface of the circuit board.

8. The display apparatus of claim 5, wherein each of the lead frames includes:
a light source connection part inserted into one of the first and second combination portions, and the light source connection part parallel to the sidewall surfaces; and
a circuit connection part extending from an end portion of the light source connection part in a horizontal direction parallel to the top surface of the circuit board,
wherein the circuit connection part is electrically connected to the external circuit.

9. The display apparatus of claim 5, wherein the radiation member includes:
a mold insertion part inserted into the third combination portion, a portion of the mold insertion part being exposed to the inner space of the mold, wherein the light source is mounted on a surface of the mold insertion part, and faces the light guide plate; and
a heat radiation part extending from an end portion of the mold insertion part in a horizontal direction.

10. A display apparatus comprising:
a light source package;
a circuit board including a recessed region in which the light source package is disposed; a display panel; and
a light guide plate,
wherein the light guide plate includes a top surface, a bottom surface, and a plurality of sidewall surfaces,
wherein a sidewall surface of the plurality of sidewall surfaces is a light incident surface on which light from the light source package is irradiated,
wherein a distance between the light source package and the light incident surface is equal or longer than a distance between the top surface of the circuit board and the light incident surface,
wherein the circuit board includes a base substrate formed of a metal material, an insulation layer disposed on the base substrate, conductive patterns disposed on the insulation layer, a passivation layer disposed on the conductive patterns, the passivation layer including openings exposing portions of the conductive patterns, and the recessed region penetrating the insulation layer and extending into the base substrate,
wherein the light source package includes a light emitting diode chip, a mold including an inner space in which the light emitting diode chip is mounted, a pair of lead frames electrically connected to the light emitting diode chip, and a radiation member contacting the base substrate, and
wherein one end of each of the lead frames is electrically connected to the light emitting diode chip and the other end of each of the lead frames is electrically connected to one of the conductive patterns.

11. The display apparatus of claim 1, wherein the driver integrated circuit disposed on the top surface of the circuit board.

12. A display apparatus comprising:
a display panel displaying images;
a light source portion including a light source package generating light and a circuit board including a recessed region in which the light source package is disposed; and
a light guide plate directing light generated from the light source package into the display panel,
wherein the light guide plate includes a top surface, a bottom surface receiving the light from the light source package, and at least one sidewall surface connecting the top surface to the bottom surface,
wherein a distance between the light source package and the light incident surface is equal or longer than a distance between the sidewall surface of the circuit board facing the light incident surface and the light incident surface,
wherein the circuit board includes a metal layer having the recessed region therein, an insulation layer disposed on the metal layer, conductive patterns disposed on the insulation layer, a passivation layer disposed on the conductive patterns, wherein the passivation layer includes openings to expose portions of the conductive patterns, wherein the light source package includes a light emitting diode chip and a pair of lead frames electrically connected to the light emitting diode chip, and wherein the lead frames are electrically connected to the conductive patterns.

13. The display apparatus of claim 12, wherein the distance between the light source package and the bottom surface of the light guide plate is equal to or less than 0.15 mm.

14. A display apparatus comprising:
a display panel;
a light guide plate disposed under the display panel, and having a top surface facing the display panel, bottom surface opposite to the top surface, and a plurality of side surfaces having an incident surface defined at one of the side surfaces;
a circuit board having a recessed region at a side surface facing the incident surface; and
a light source package inserted in the recessed region, and emitting light to the incident surface; and
a driver integrated circuit disposed on the circuit board, and generating control signals that control the display panel and the light source package, and
wherein a distance between the light source package and the light incident surface is equal or longer than a distance between the side surface of the circuit board facing the light incident surface and the light incident surface, and
wherein the circuit board comprises a metal layer, an insulation layer disposed on the metal layer, conductive patterns disposed on the insulation layer, and a passivation layer disposed on the conductive patterns, and wherein the recessed region penetrate sidewall of the metal layer, insulation layer, and the passivation layer.

15. The display apparatus of claim 14, wherein the light source package comprising:
a mold including a window disposed at one surface of the mold to expose an inner space of the mold and a plurality of combination portions disposed at another surface of the mold;
a light source disposed in the inner space of the mold and facing the window;
a radiation member combined with the mold through one of the combination portions to conduct heat from the light source toward an outside of the mold, the radiation member extending outside of the one of the combination portions; and
an electrode terminal electrically connecting the light source to the circuit board, the electrode terminal including a first lead frame and a second lead frame,
wherein the radiation member has a first portion disposed in the inner space and parallel to the side surface of the circuit board, and a second portion bent from the first portion and parallel to the top surface of the circuit board, and
wherein the first and second lead frames are combined with the mold through respective combination portions other than the combination portion corresponding to the radiation member.

16. The display apparatus of claim 15, wherein the light source combined to the first portion of the radiation member.

17. The display apparatus of claim 16, wherein each of the combination portions is a groove formed in a surface of the mold located opposite to the window.

18. The display apparatus of claim 16, wherein the plurality of combination portions are through holes penetrating a top plate of the mold located perpendicular to the window.

19. The display apparatus of claim 16, wherein each of the lead frames includes:
a light source connection part inserted into one of the first and second combination portions, and which are parallel to the side surface of the circuit board; and
a circuit connection part extending from an end portion of the light source connection part in a horizontal direction which is parallel to the top surface of the circuit board,
wherein the circuit connection part is electrically connected to the circuit board.

20. The display apparatus of claim 19, further comprising a driver integrated circuit disposed on the top surface of the circuit board generating control signals that control the display panel and the light source package.

21. The display apparatus of claim 1, wherein the sidewall surface of the circuit board facing the light incident surface almost directly contacts the light incident surface of the light guide plate.

22. The display apparatus of claim 12, further comprising a plurality of light source packages, and
wherein the circuit board further comprises a plurality of recessed region which the plurality of the light source packages respectively inserted in.

* * * * *